(12) United States Patent
Mathur

(10) Patent No.: US 9,134,064 B2
(45) Date of Patent: Sep. 15, 2015

(54) PROCESS VESSEL COOLDOWN APPARATUS AND METHOD

(71) Applicant: Aggreko, LLC, New Iberia, LA (US)

(72) Inventor: Umesh Mathur, Houston, TX (US)

(73) Assignee: Aggreko, LLC, New Iberia, LA (US)

( * ) Notice: Subject to any disclaimer, the term of this patent is extended or adjusted under 35 U.S.C. 154(b) by 0 days.

(21) Appl. No.: 14/498,157

(22) Filed: Sep. 26, 2014

(65) Prior Publication Data

US 2015/0096309 A1    Apr. 9, 2015

Related U.S. Application Data

(60) Provisional application No. 61/886,718, filed on Oct. 4, 2013.

(51) Int. Cl.
  *F25D 31/00* (2006.01)
  *B01J 8/02* (2006.01)
  *B01J 19/00* (2006.01)

(52) U.S. Cl.
  CPC .............. *F25D 31/00* (2013.01); *B01J 8/0285* (2013.01); *B01J 19/0013* (2013.01); *B01J 2208/00256* (2013.01); *B01J 2219/2409* (2013.01)

(58) Field of Classification Search
  CPC ................. B01J 8/0285; B01J 19/0013; B01J 2208/065; B01J 2208/00168; B01J 2208/00176; B01J 2208/00256; B01J 2208/00265; B01J 2208/00274; B01J 2219/2409; B01J 2219/2417; B01J 2219/2411; B01J 2219/2416; B01J 2419/2461; B01J 2219/2462; B01J 2219/2467; C10G 11/00; C10G 45/00; C10G 47/00; F25D 31/00; F25D 31/06
  USPC .......... 208/107, 108, 113, 132, 143, 208–210; 62/56, 96, 115, 118, 121; 165/104.11, 165/104.28, 104.31, 104.33, 104.34, 108; 422/173, 198, 206, 207, 233–235, 621
  See application file for complete search history.

(56) References Cited

U.S. PATENT DOCUMENTS

| | | | | |
|---|---|---|---|---|
| 2,921,053 | A * | 1/1960 | Dye | 528/501 |
| 3,336,761 | A * | 8/1967 | McHarg | 62/623 |
| 4,160,806 | A | 7/1979 | Long et al. | |
| 4,197,184 | A * | 4/1980 | Munro et al. | 208/89 |
| 4,807,698 | A | 2/1989 | Kohnen et al. | |
| 4,971,767 | A * | 11/1990 | Ludwigsen et al. | 422/144 |
| 5,192,132 | A * | 3/1993 | Pelensky | 374/166 |

(Continued)

*Primary Examiner* — Joseph Drodge
(74) *Attorney, Agent, or Firm* — Law Office Of Jesse D. Lambert, LLC

(57) ABSTRACT

A system and method of use of same for cooling process vessels, particularly those having reactor beds inside such as hydrotreaters, hydrocrackers, and catalytic reformers as part of processing units, during unit turnarounds. While the process vessel is in normal operation or in a preliminary cool down phase, quench gas flow is routed through a bypass flow path while a recirculating gas cooling system is installed in the primary flow path, requiring no unit downtime. During a turnaround, the process vessel temperature is lowered to a desired temperature, permitting entry and replacement of catalyst inventory, using the existing hydrogen recirculating (recycle gas) compressor to circulate a recirculating gas stream through the recirculating gas cooling system, the process vessel, and back through the compressor and recirculating gas cooling system. The cooling system removes heat from the circulating flowstream, thus lowering the process vessel temperature, faster than cold nitrogen injection methods.

19 Claims, 9 Drawing Sheets

(56) References Cited

U.S. PATENT DOCUMENTS

| | | | |
|---|---|---|---|
| 5,268,942 A | | 12/1993 | Newton et al. |
| 5,343,939 A | * | 9/1994 | Cetinkaya et al. ....... 165/104.18 |
| 5,452,757 A | * | 9/1995 | Lomas ..................... 165/104.16 |
| 5,462,717 A | * | 10/1995 | Pfeiffer ........................ 422/146 |
| 5,492,617 A | * | 2/1996 | Trimble et al. ............... 208/148 |
| 5,869,011 A | * | 2/1999 | Lee .............................. 422/200 |
| 6,224,747 B1 | * | 5/2001 | Cash et al. ..................... 208/58 |
| 7,112,311 B2 | * | 9/2006 | Yoshizumi et al. ........... 422/610 |
| 7,682,460 B2 | | 3/2010 | Ferrara |
| 8,480,812 B2 | | 7/2013 | Nath et al. |
| 2001/0042699 A1 | * | 11/2001 | Cash et al. ..................... 208/58 |
| 2004/0069681 A1 | * | 4/2004 | Peterson et al. .............. 208/113 |
| 2004/0134518 A1 | * | 7/2004 | Kraus et al. ..................... 134/18 |
| 2005/0006281 A1 | * | 1/2005 | Boger et al. .................. 208/143 |
| 2013/0121454 A1 | | 5/2013 | Newton et al. |
| 2013/0248419 A1 | * | 9/2013 | Abba et al. ..................... 208/73 |
| 2013/0274508 A1 | * | 10/2013 | DeCourcy et al. ............ 562/534 |

\* cited by examiner

PROCESS VESSEL COOLDOWN APPARATUS AND METHOD

CROSS REFERENCE TO RELATED APPLICATIONS

This regular United States Patent Application claims priority to provisional U.S. Patent Application Ser. No. 61/886,718, filed Oct. 4, 2013, for all purposes. The disclosure of that application is incorporated herein, to the extent not inconsistent with this disclosure.

BACKGROUND

1. Field of the Invention

This invention relates to apparatus and methods for cooling large vessels and the contents thereof. While the scope of the invention encompasses any type of vessel, broadly referred to as a "process vessel," the invention has particular applicability to large vessels used in industrial applications, namely in process units, including but not limited to hydroprocessing reactors such as hydrotreaters, hydrocrackers, and catalytic reformers having voluminous beds of catalyst therein, etc. As described in more detail below, at periodic intervals such vessels must be cooled, from their normal operating temperature to a much lower temperature, typically near ambient temperature, in order to permit entry into the vessels for replacement of the catalyst beds therein. The work period during which the catalyst is replaced is commonly known as a "turnaround."

Hydrotreaters, hydrocrackers, and catalytic reformers are crucial for processing or producing distillate products (e.g., gasoline, jet fuel, diesel, or feeds to downstream units such as catalytic crackers) from crude oil in order to meet numerous product quality specifications, chief among them being organic sulfur and nitrogen content. For hydrotreaters, for example, as allowable sulfur limits have been tightened (e.g., for ultra-low sulfur diesel, ULSD), the processing requirements have become more severe. A hydroprocessing reactor contains large amounts of catalyst through which the untreated feed stream, mixed with hydrogen and other light gases, flows at high temperature and pressure. This enables converting the sulfur and other impurities present in the feed stream into hydrogen sulfide, ammonia, etc., which are then removed in downstream processing facilities. Also, some fraction of the feed may be converted into lighter fractions when hydrocracking reactions occur.

After some period of operation, typically two to five years, the catalyst in process vessels such as hydrotreaters, hydrocrackers, and catalytic reformers is "spent" and must be replaced. This requires the vessel (unit) to be brought down or taken out of service for a turnaround, during which catalyst replacement and other maintenance and repair activities are carried out. The duration of the turnaround must be minimized to avoid excessive economic losses from the production outage. A key requirement during the turnaround is to cool the process vessel to ambient temperature so that the catalyst can safely be unloaded and replaced, and entry into the vessel becomes feasible for other maintenance-related repairs.

FIG. 1 shows an exemplary prior art arrangement of a typical process system or processing unit, for example a hydrotreater system 10, comprising a process vessel (e.g. hydrotreater reactor) 100; in-place compressor, namely a hydrogen recirculating compressor or recycle gas compressor 110; and a piping system, generally referred to as piping system 120, forming multiple flow loops or flow paths in the system, commonly referred to as the "reactor loop." As known in the art, during normal product processing, unit feed (e.g. crude oil) is supplied to piping system 120 (piping system 120 referring generally to the collection of piping shown in the figures) at a point downstream of recycle gas compressor 110 (as shown in FIG. 1), where it joins a makeup hydrogen stream and a recycle gas stream moved by recycle gas compressor 110; the combined stream flows through flowline 123 to process vessel 100. The combined stream exits process vessel 100, and typically flows through one or more effluent coolers 150 (one or more of which are part of the feed preheat train) and a flash vessel or separator 160. Liquid product exits separator 160 as shown (for further handling and/or processing), and recycle gas exits separator 160 and returns to recycle gas compressor 110. Gas removal (purge) is noted in FIG. 1. This purge stream removes pollutants and other components from the recycle gas.

In addition to the product/recycle gas flow loop, known installations usually comprise other elements. One or more isolation valves 130 may be disposed in the recycle gas flowline and, after preheat exchangers 150 (which pick up heat from the reactor effluent), a fired heater 140 permits heating of the combined feed/make-up hydrogen/recycle gas streams. One or more alternate recycle gas (typically hydrogen-rich) injection points into lower beds of process vessel 100 are typically provided, for example through flowlines 190, 200 and 300, collectively referred to as quench flowlines, as shown. It should be understood that, during normal operation of the unit, the primary purpose of quench flowpaths 190, 200 and 300 is to enable unheated recycle gas, discharged from recycle gas compressor 110, to be introduced into the top of each catalyst bed in process vessel 100 in the event that temperature in any portion of that bed exceeds a pre-determined maximum. Accordingly, flow of unheated recycle gas through quench flowlines 190, 200, and 300 is generally intermittent. Note that each of quench flowlines 190, 200, and 300 further comprise bypass flowlines and valves as follows: quench flowline 190, comprising valves 20, 30 and 40, and bypass line 52, comprising valve 50; quench flowline 200, comprising valves 210, 220, and 230, and bypass line 250, comprising valve 240; and quench flowline 300, comprising valves 310, 320 and 330, and bypass line 350, comprising valve 340. It is understood that other arrangements of quench piping and valves are possible.

Note that some of the reactor effluent coolers 150 are used typically to preheat the feed to furnace 140 (the piping to do so not shown for clarity), and may additionally incorporate air- or water-cooled exchangers, prior to separator 160. Fluid flow directions are indicated by arrows in FIG. 1. Other inputs/products to the system are noted in the drawings, in particular FIGS. 1-4 and FIG. 6.

2. Prior Art Process Vessel Cooldown Process

Hydrotreater, hydrocracker and catalytic reformer reactors are very large process vessels that can weigh as much as a million pounds or more; additionally, they contain a catalyst inventory approaching a million pounds or more. As can readily be understood, the process reactor vessel, referred to generally herein as "process vessel," and its catalyst inventory contain a tremendous amount of thermal energy (heat) during normal operation. Generally, following cutoff of unit feed and makeup hydrogen, and shutdown of furnace 140, process vessel cool-down has required many days, and this has traditionally been carried out in two phases as follows:

(a) Phase I, comprising a fairly rapid reduction in temperature from a first operating temperature of c. 500 to 800° F. to an intermediate temperature of around 200-250° F., using available in-line cooling facilities. This phase I cooling is typically carried out by circulating hydrogen through the process vessel by use of the recycle gas compressor, and using any existing cooling facilities in the flow loop to cool the recirculating flowstream. Significant limitations exist with this method. The available cooling is of limited thermal capacity, and as it uses the surrounding environment as the energy sink and, therefore, cannot achieve a final temperature lower than ambient. In practice, this final temperature is significantly higher than the ambient temperature, and is typically around 150-250° F., depending on ambient air temperature and system design. Once this temperature range is reached, the cooling curve flattens out and the cooling rate (using only the existing air and/or water cooled exchanger) becomes unacceptably slow, so that Phase II is entered, as below, to enable further reducing the reactor temperature to a value that would be safe for entry by maintenance personnel.

(b) Phase II, comprising a cool-down phase from an intermediate temperature of around 150-250° F. to a second or final temperature, typically around 80-100° F., which in the past has commonly been carried out using injection of purchased liquid nitrogen that is either vaporized prior to injection or injected directly as a liquid into the reactor inlet, with the effluent gases from the hydroprocessing reactor being flared. It is this cold injected nitrogen stream, normally flared upon exiting the reactor vessel, that removes heat from the process vessel. It should be noted that chilled air cannot be injected instead of nitrogen because the catalysts typically used in such reactors (which may even be pyrophoric) cannot be exposed to oxygen for reasons of safety.

However, the rate of nitrogen injection is limited, (a) by its extremely high cost, (b) by the safety requirements not to overload the flare gas system, (c) the need to avoid diluting flare gas heating value which could result in extinction of the flare flame, and (d) by the requirement not to lower the temperature of metallic piping and other components beyond safe metallurgical limits. As a result, this second cooling phase (Phase II) has traditionally required several days to complete, at significant cost, owing to the slow rate of nitrogen injection and also the loss of production resulting from extended facility downtime, plus the purchase cost of the nitrogen.

In prior art systems, the surrounding environment is the available heat "sink," and cannot provide sufficient heat extractive capacity to efficiently cool the process vessel to a desired end temperature suitable for personnel entry. Among other reasons the available temperature differential between the ambient temperature and the temperature of the hot reactor effluent is too small.

Accordingly, there is a great economic incentive to shorten the Phase II cool-down cycle, thus enabling the process vessel and associated processing unit to be restored to full production rates in a shorter time. In addition, avoidance of the nitrogen-related costs would result in significant savings.

SUMMARY OF THE INVENTION

The present invention presents an improved apparatus and method for cooling down large reactor vessels and the contents thereof, for example hydrotreater, hydrocracker, and catalytic reformer reactors and the catalyst inventory therein, referred to broadly at times in this patent application as "reactor," "reactors," "process vessel" or "process vessels." Hydrotreater, hydrocracker, and catalytic reformer reactor installations have in place a large compressor, commonly referred to as a hydrogen recycle compressor or recycle gas compressor, which as described above is used in ordinary operation to compress and recycle hydrogen-rich gases through the process vessel and the piping system comprising the reactor loop. The process vessel and the recycle gas compressor are fluidly connected by a piping system or reactor loop, as is known in the art, permitting recirculating of fluid, namely recycle gas, through the recycle gas compressor, through the process vessel, and back to the recycle gas compressor. This recycle gas compressor, already in place, can beneficially be used, in combination with an additional recirculating gas cooling system as described herein, in the cooling process by operating it at a lower pressure during Phase II, as may be required for metallurgical reasons, than the pressure used during Phase I of the cooling cycle.

Apparatus associated with the present invention comprises a recirculating gas cooling system, which may comprise a heat exchanger system, one embodiment of which may comprise a chilled liquid or vaporizing/cold refrigerant system, operatively connected to the piping system. One suitable recirculating gas cooling system comprises a chilled liquid heat exchanger system comprising one or more chilled liquid-cooled heat exchangers, which receive on one side the recirculating gas stream carrying heat from the process vessel, and on the other side a chilled water (or other cooling medium) stream, at a temperature that is lower than the ambient air or cooling water temperature, typically by 30-50° F. Various piping, valves, controls, etc. are associated with the heat exchanger assembly. FIG. 4 shows schematically the apparatus embodying the principles of the present invention in simplified form, comprising a process vessel 100, a reactor effluent cooling system (separator) 160, a recycle gas compressor 110, a piping system forming a reactor loop, and a suitable recirculating gas cooling system 60, disposed in the recirculating loop, preferably (but not necessarily) downstream of the recycle gas compressor and upstream of the process vessel. The terms "recirculating gas" or "recycle gas" as used herein are in a broad sense, and include any composition of gas, including but not limited to hydrogen, nitrogen or other gases, used during the process vessel cooldown process as described herein, and further includes any type of fluid, whether in gaseous or supercritical state.

During the period when the process vessel (reactor) cooldown is being performed, using the methods described in this application, the normal feed to the process vessel and the makeup hydrogen streams are both shut off. Also, the heater that is used to preheat the mixture of feed, recycle hydrogen, and makeup hydrogen streams to the normal reactor inlet temperature is shut off. The recycle gas stream continues to flow through quench flowlines 190, 200 or 300, but generally not through the preheat system or heater.

One method of the present invention comprises providing the above apparatus, and flowing a recirculating gas stream, which may be a hydrogen-rich stream, through the existing recycle gas compressor, reactor or process vessel, and the recirculating gas cooling system, until the process vessel, including its catalyst beds, and associated inventory of catalysts have been cooled to a desired temperature safe for human entry. The rate of recirculating gas can be much greater than the nitrogen injection rate of prior art methods, thus enabling far more rapid cooling and achieving the desired reduction in turnaround time, despite use of coolant in the heat exchanger that may be at a higher temperature than the traditional nitrogen cooling stream injected into the reactor for the same purpose. Recirculating gas or fluids other than hydrogen may be beneficially used in the method, as well.

Yet another aspect of the present invention comprises a method of installing the recirculating gas cooling system into the recycle loop via one of the quench flowlines 190, 200 and 300, while continuing normal operation of the facility or during Phase I of the cooling cycle, as described above; the apparatus associated with this method is a further aspect of the invention. As previously noted, each of the quench flowlines comprises a bypass line, and normal process flow can continue, along with quench gas flow as needed through the bypass flow path in a selected quench flowline, while the recirculating gas cooling system is installed in the primary flow path of the selected quench flowline. Once installed, quench flow can resume through the primary flow path.

Generally, recirculating gas cooling systems (which may be heat exchanger systems) suitable for use in the presently preferred embodiments are those having the capacity to lower the recirculating hydrogen (or other fluid) stream to a temperature significantly below the ultimate desired process vessel temperature. By way of example, with the ultimate desired process vessel temperature on the order of 80 to 100° F. (in order to allow personnel entry), the heat exchanger system lowers the recirculating stream temperature approximately 20 to 50° F. below this ultimate temperature, for example 30 to 40° F. below the ultimate desired process vessel temperature. With these exemplary values, the temperature of the recirculating stream would be approximately 40 to 60° F. It is to be understood that a number of variables affect the final design value for the recirculating gas (or other fluid) stream temperature, including fluid circulating rate, heat capacity of the vessel(s) and catalyst being cooled, starting and final desired temperatures, characteristics of the circulating fluid, desired cool-down duration for Phase II, etc. The temperature values recited above are by way of example only and not limitation.

It is understood that the present apparatus and methods may be used in connection with a variety of process vessels, including but not limited to hydrotreaters, hydrocrackers, and catalytic reformers.

BRIEF DESCRIPTION OF THE DRAWINGS

FIG. 1 depicts flow lines 190, 200 and 300 through which quench gas (unheated gas from the compressor discharge) may flow intermittently above each of the reactor catalyst beds for bed temperature control.

DESCRIPTION OF THE PREFERRED EMBODIMENT OF THE INVENTION

While various apparatus and methods can embody the principles of the present invention, with reference to the drawings, some of the presently preferred embodiments can be described.

Key aspects of the present invention include the recognition and use of the existing hydrogen recirculating compressor, also commonly referred to as a recycle gas compressor (typically, but not necessarily, already in place in the processing system), which is capable of circulating a fluid stream, namely a large flow rate of hydrogen or other recirculating gas through the process vessel and its contents (e.g. a catalyst inventory). This hydrogen or other recirculating gas stream provides a "coolant" fluid stream capable of removing large amounts of thermal energy from the process vessel in relatively short time, compared to prior art systems that utilize nitrogen injection into the reactor. The present invention further comprises a method for installing a recirculating gas cooling system, which may be a heat exchanger system, for example a chilled liquid heat exchanger system, into the piping system. The recirculating gas cooling system may be installed into the quench flowlines (reactor loop) carrying the recirculating hydrogen or other recycle stream, the recirculating gas cooling system having the capacity to remove a large amount of thermal energy from the hydrogen or other recirculating gas stream, and thus from the process vessel. The recirculating gas cooling system is one capable of cooling a desired flowrate of cooled recirculating fluid, usually gas (e.g. hydrogen), for example at 30 to 40° F. below the ultimate desired process vessel temperature. The installation of the recirculating gas cooling system into the piping system for the quench flowlines, with the method of the present invention, requires no production downtime. Preferably, but not exclusively, the recirculating gas cooling system is disposed in the piping system downstream of the recirculating (recycle gas) compressor and upstream of the process vessel.

Exemplary Flowstreams

Figure 1:
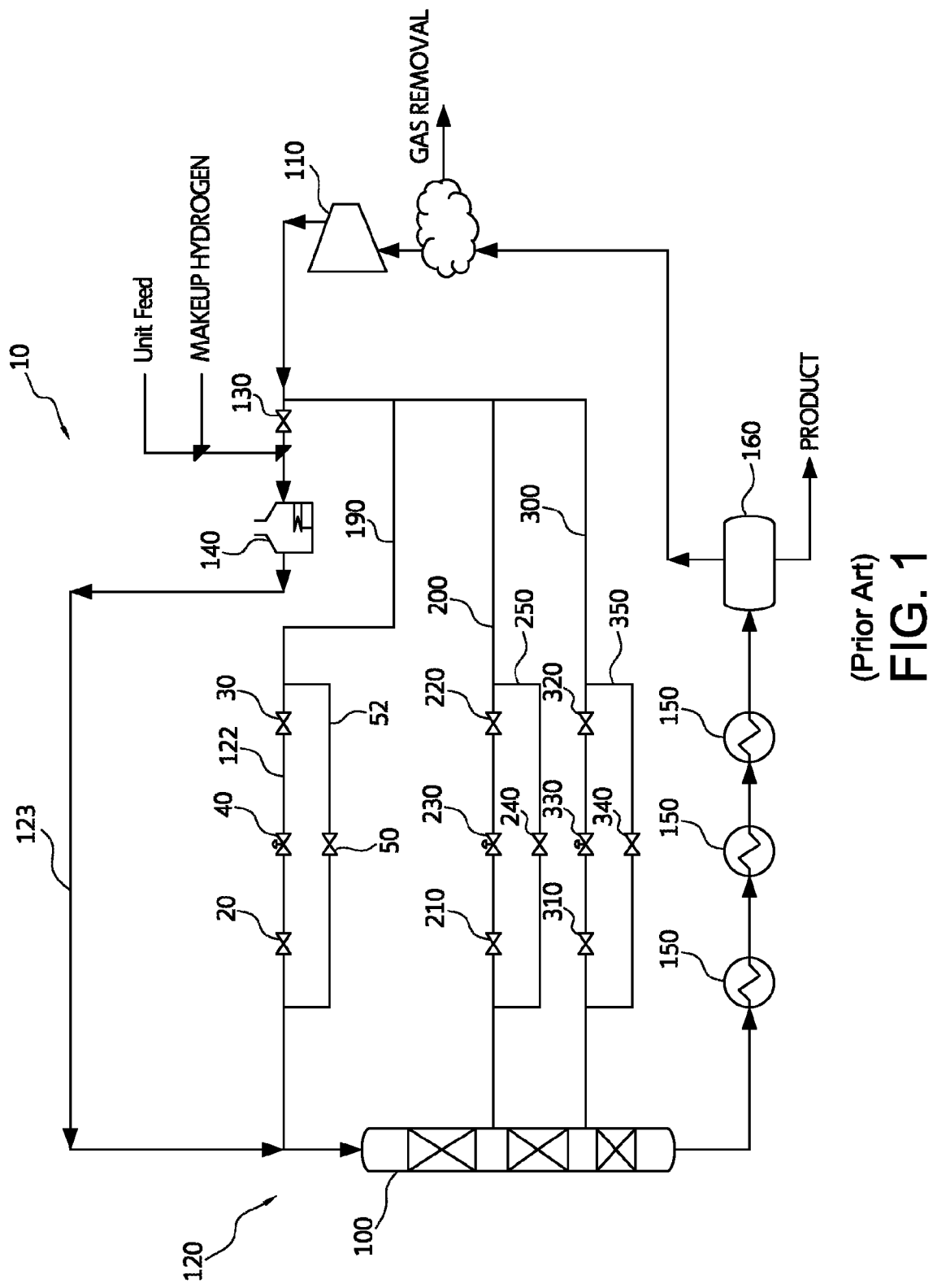
FIG. 1 is a schematic of a prior art arrangement of an exemplary processing system, comprising a process vessel, recycle gas compressor, and associated piping, valves, etc. in a normal flow condition. The normal flow occurs through the lines that have arrows showing the direction of flow.

FIG. 1 is a schematic of a prior art arrangement of an exemplary processing unit system 10, comprising a process vessel and associated piping system, valves, etc. in a normal flow condition. Process vessel 100 may be a hydrotreater, hydrocracker, catalytic reformer, or any other reactor vessel or vessels to be cooled down, typically, but not necessarily, comprising an inventory or volume of catalyst therein. Unit Feed is depicted, which is the feed source of the product being treated. Makeup Hydrogen is also depicted, which is the source for the hydrogen consumed in the ordinary process. A compressor, namely a recycle gas compressor 110, is fluidly connected to process vessel 100 by a piping system 120, comprising flowlines 123, 190, 200, and 300, between other elements of the system. Additional equipment typically part of such system includes an isolation valve 130, one or more feed preheat/reactor effluent cooling exchangers 150, feed preheat fired heater 140, and flowline 123 therefrom, one or more effluent coolers 150, and a flash vessel 160. The primary flowpaths, during normal operation of the processing unit, are in the direction noted, through the piping system 120, in particular that portion noted as flowline 123. It is understood that "piping system 120" refers to the overall network or assembly of piping depicted in the figures. As previously described, unit feed enters the system as shown, flows through preheaters 150 and heater 140, and through flowline 123 to process vessel 100. Recycle hydrogen leaves compressor 110, flows through isolation valve 130, and mixes with the unit feed and makeup hydrogen streams as shown. This mixture of unit feed, makeup hydrogen, and recycle hydrogen flows through preheaters 150, heater 140, flows through primary flowpath 123, and eventually into process vessel 100. When needed for reactor bed temperature control, recycle hydrogen flows through one or more quench flowlines 190, 200, and/or 300; as previously noted, this hydrogen flow through the quench flowlines is used only intermittently to cool one or more reactor beds in process vessel 100. When recycle gas is flowing through a quench flowline, e.g. flowline 190, block valves 20 and 30, along with control valve 40, are all open and form the primary hydrogen recycle flowpath. Bypass valve 50 in bypass line 52 is closed. As readily understood, the combined unit feed/makeup hydrogen/recycle hydrogen stream and and quench flowline flowpaths are in parallel with one another.

As shown in the figures, one or more quench flowlines (e.g., 190, 200, or 300) are provided for recycle gas flow from the compressor discharge to the top of each catalyst bed within the reactor. This permits an unheated recycle hydrogen stream to be injected into the top of each catalyst bed of process vessel 100, thereby enabling reduction in catalyst bed temperature. It is understood that such flow is generally intermittent, and lasts only long enough to restore the catalyst bed to the proper temperature. Quench flowline 190 has block valves 20 and 30, along with control valve 40, and bypass valve 50 in bypass lane 52. Similarly, quench flowline 200 has block valves 210 and 220, along with control valve 230, and bypass valve 240 in bypass line 250. Finally, quench flowline 300 has block valves 310 and 320, along with control valve 330, and bypass valve 340 in bypass line 350.

Figure 2:
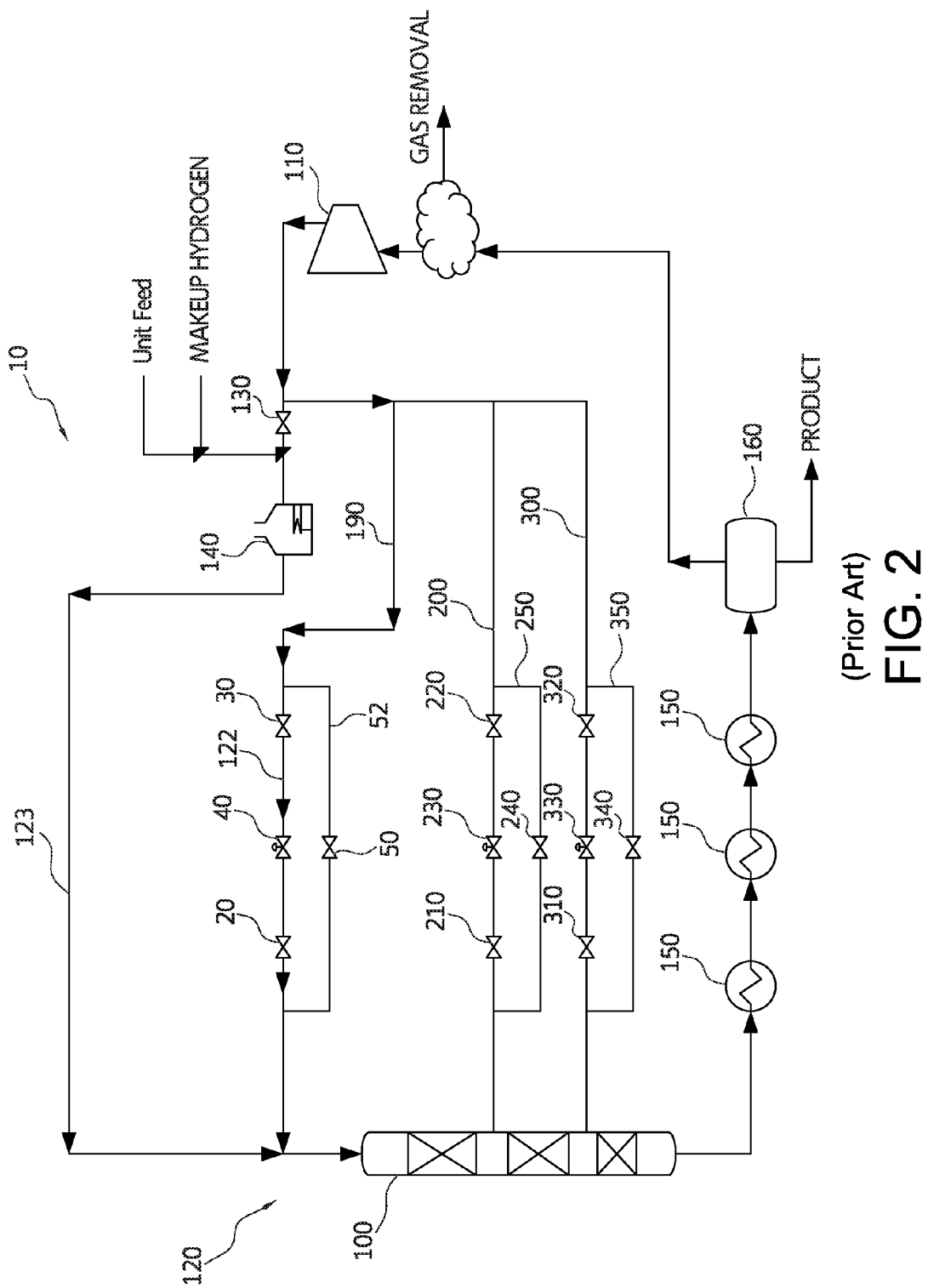
FIG. 2 is a schematic of a prior art arrangement of FIG. 1, showing flow through quench line 190 during normal operation, namely through flowline 122 and valves 20, 30 and 40 (valve 50 being closed). This operating mode would enable unheated quench flow to the top bed.

FIG. 2 is a schematic of a prior art arrangement of an exemplary process vessel and associated piping system, as shown in FIG. 1, showing quench gas flow through quench flowline 190 in a normal or primary flow condition, through flowline 122 and valves 20, 30 and 40.

Figure 3:
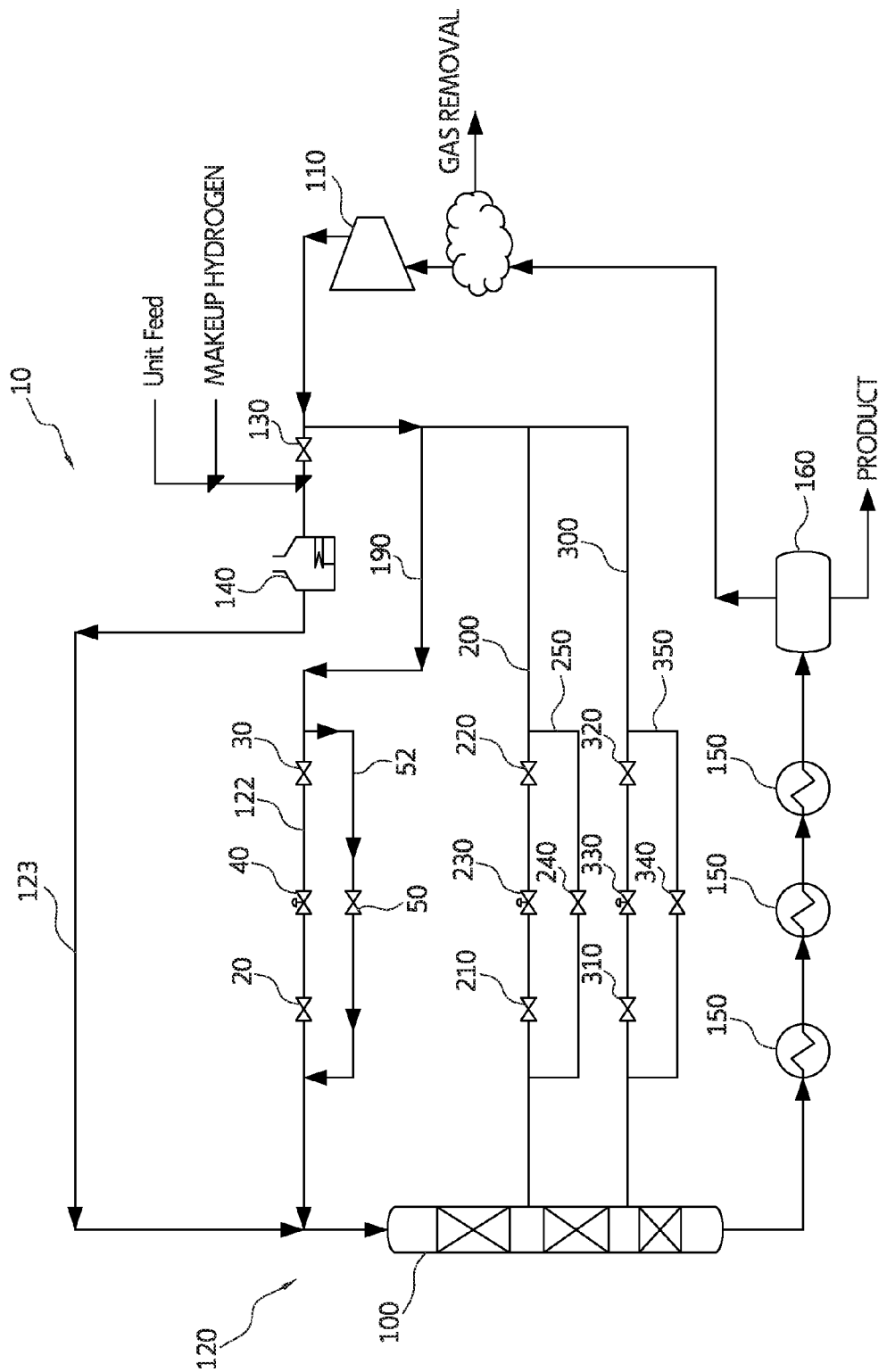
FIG. 3 is a schematic of a prior art arrangement of FIG. 1, showing flow through quench line 190 in a bypass mode, namely through valve 50 and bypassed around valves 30, 40, and 20 (those valves being closed).

FIG. 3 is a schematic of a prior art arrangement of an exemplary process vessel and associated piping system, as shown in FIGS. 1 and 2, but with the valves, etc. in quench flowline 190 in a bypass flow condition. This condition would typically be observed if (for example) control valve 40 needed to be taken out of service for maintenance, repairs, or replacement. Here, bypass valve 50 is open, and the three valves in the primary flowpath, namely block valves 20 and 30, and control valve 40, are all closed. When quench flowline 190 is in this bypass mode, when needed a portion of the recycle gas from the compressor discharge can still flow through bypass valve 50 in quench flowline 190 and into the top of process vessel 100. Quench gas flow can continue through the bypass flow path until work is complete on modifications to the primary quench gas flow path components, as described herein.

Figure 5:
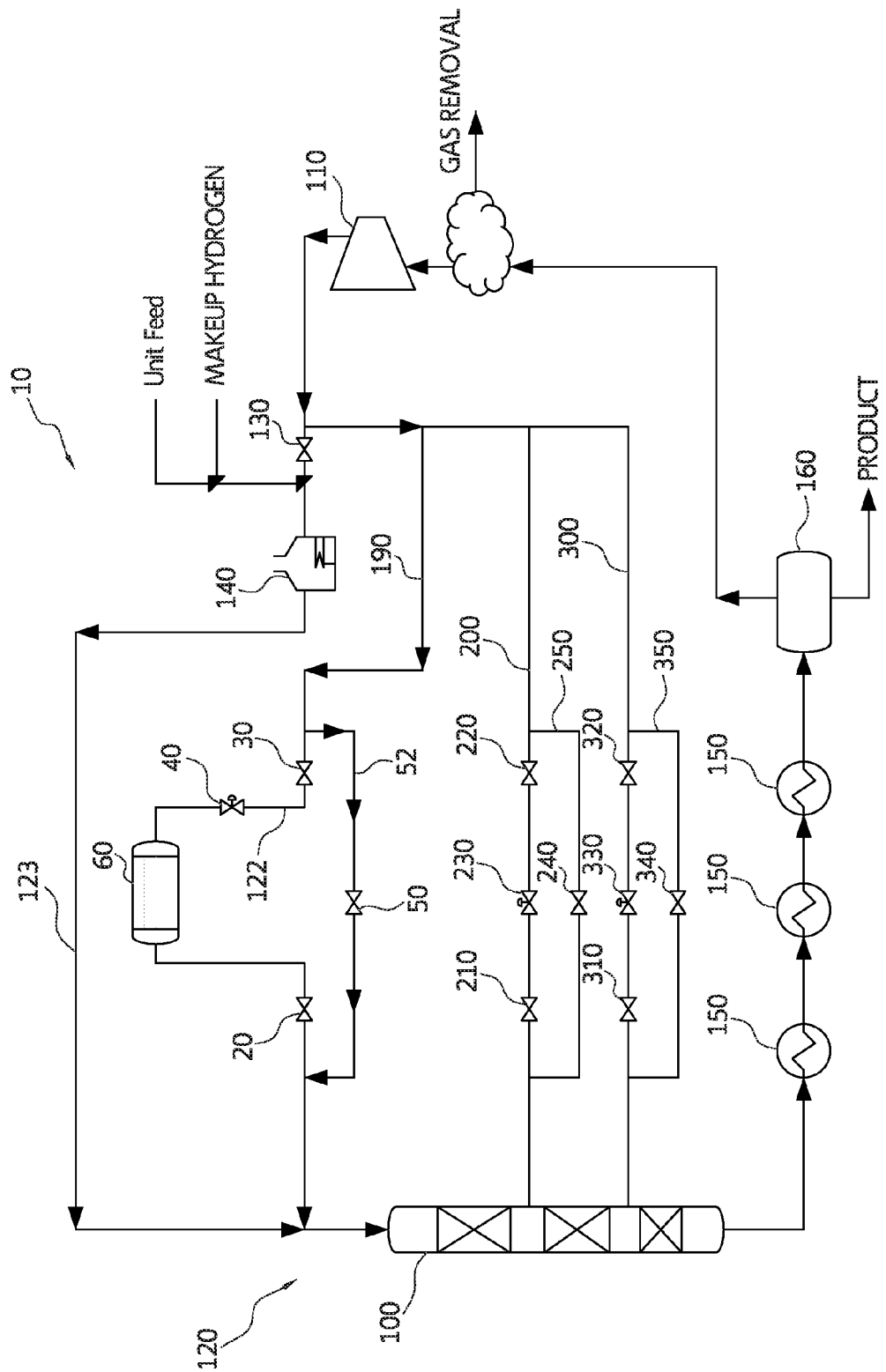
FIG. 5 is a schematic of the flow arrangement of FIG. 3 (fluid flowing through the bypass line 52 of quench flowline 190), while a recirculating gas cooling system is installed and positioned in the primary flow path of quench line 190. Note that valves 30 and 20 remain closed while installation is taking place, and valve 40 may be relocated, if needed for flow control.

Installation of the Recirculating Gas Cooling System, without Incurring Processing Unit Downtime One aspect of the present invention comprises a method of installing a recirculating gas cooling system, which may be a heat exchanger system, into the primary flow path of a quench flowline, which may be quench flowline 190, without incurring any processing unit downtime. Referring to FIG. 5, with quench gas flow ongoing through the bypass line in flowpath 190 (only as may be required, as in FIG. 3), it being understood that quench gas flow is generally only intermittent, the primary flowpath may be disassembled (piping, valves, etc. as necessary) to install recirculating gas cooling system 60, represented in block or simplified form in FIG. 5. Note that valves 20 and 30 in quench flowline 190 would remain closed during this installation process. These piping and other components may be pre-fabricated prior to the turnaround to minimize the duration of the installation operation. Of course, since bypass valve 50 remains open during this installation, the process unit could continue to run without interruption and any required flow of unheated recycle gas, namely quench gas, to the top bed in process vessel 100 is neither disturbed nor interrupted.

In FIG. 5, note that installation of recirculating gas cooling system 60 is carried out while quench hydrogen flow continues (if required) through the bypass flowpath of quench flowline 190, therefore requiring no downtime of the facility. Other valves, controls, etc. may be added to recirculating gas cooling system 60 as needed. It is to be understood that the above-described method of connecting recirculating gas cooling system 60 into an operating process flowstream at a facility, while incurring no downtime of the facility, comprises one of the aspects and points of novelty of the present invention.

Figure 4:
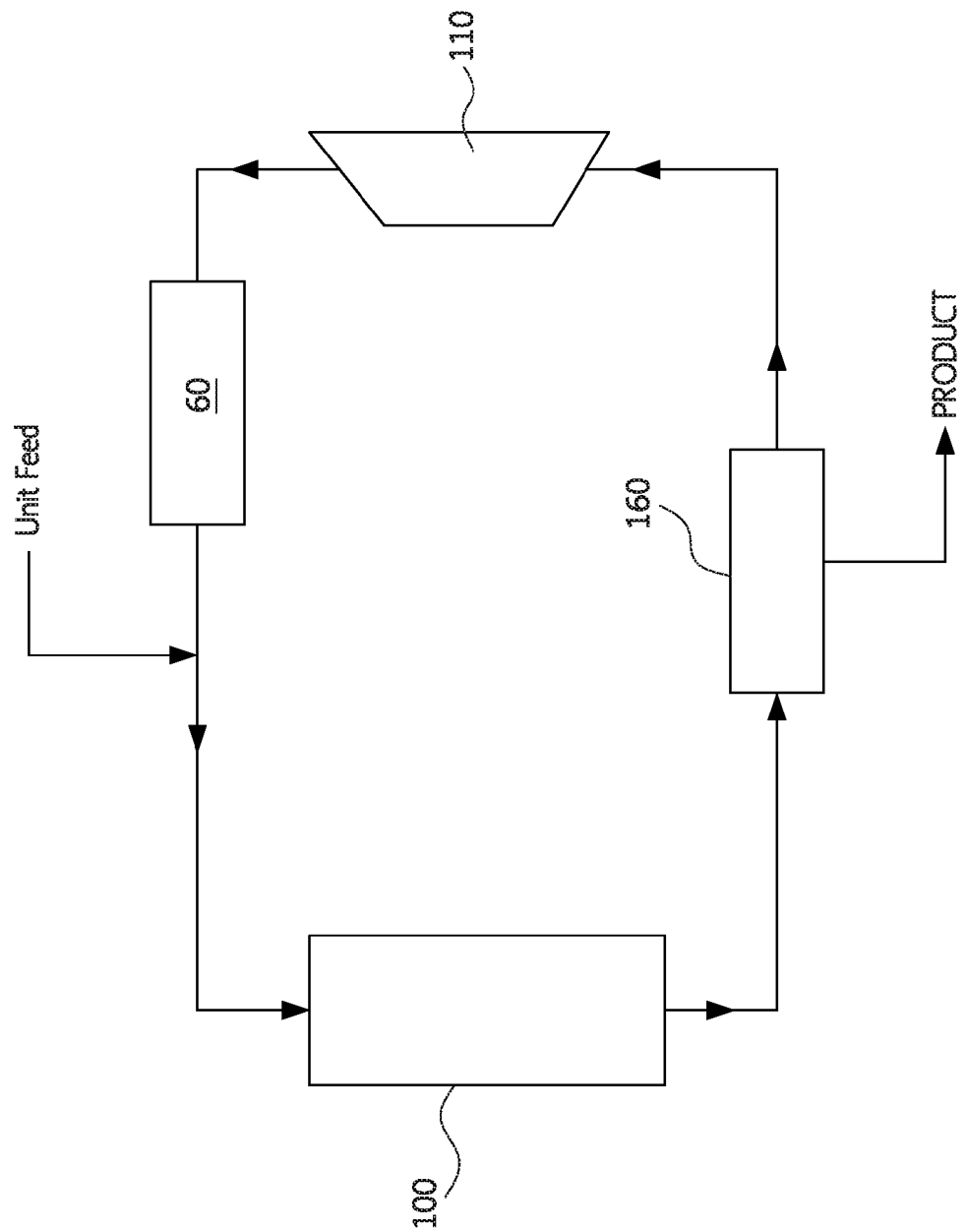
FIG. 4 is a simplified schematic of a system embodying the principles of the present invention.

As can be seen in FIG. 5 (and as can be readily understood from FIG. 4), recirculating gas cooling system 60 is preferably positioned in the overall fluid flow loop (reactor loop) downstream of recycle gas compressor 110, and upstream of process vessel 100; that is, disposed between recycle gas compressor 110 and the top catalyst bed in process vessel 100. Positioning of recirculating gas cooling system 60 as shown in FIG. 5 enables cooling of the recirculating flowstream after it has gone through recycle gas compressor 110, where it will experience a temperature increase resulting from the compression process. However, the scope of the present invention includes recirculating gas cooling system 60 positioned in any location within the overall recycle loop.

It is to be noted that the apparatus of the present invention comprises a process unit having the above-described recirculating gas cooling system 60 installed in the reactor loop at any time in the operating life of the unit, including installation done as a part of initial fabrication and construction of the unit; for example, in a newly built unit, or during downtime of the unit for turnaround, repair, etc.

Such permanent facilities for enabling the recirculating gas cooling system and other equipment to be installed, in the way described herein, would have the significant advantage of permitting rapid assembly and disassembly of the temporary cooling facilities and equipment described herein. The disassembly steps would be carried out in reverse order to those used for assembly.

Phase II Cooling

To switch to Phase II cooling, with recirculating gas cooling system 60 as described above in place, FIG. 6 shows that flow of recycle gas is enabled through the quench flowline 190, including recirculating gas cooling system 60, with block valves 20 and 30 and relocated control valve 40 open, and bypass valve 50 closed. It is understood that the overall fluid flow path is recirculating, in that the hydrogen-rich gas is discharged from compressor 110, flows through through recirculating gas cooling system 60, through process vessel 100, and back again through recycle gas compressor 110 where the cycle repeats. Note that, in Phase II, flow through flowline 123 is generally shut off. Thus, during both Phase I and Phase II cooling, flows of the unit feed, makeup hydrogen, and recycle stream flows are eliminated and heater 140 fuel firing is also turned off.

Now, with a recirculating fluid stream flow through the quench flowline and through recirculating gas cooling system 60, the present invention can capitalize on the large circulation capability of the existing recycle gas compressor 110. As is understood, the recycle flowstream absorbs thermal energy from the relatively hot process vessel 100 and its contents, flows through recycle gas compressor 110, and thence through recirculating gas cooling system 60, where heat is transferred from the recycle flowstream to a cooling medium (coolant) having a supply temperature maintained sufficiently below the desired final temperature of the process vessel, namely hydrotreater, hydrocracker, or catalytic reformer reactor, and preferably significantly below an ambient temperature. This coolant supply temperature and flow rate are adjusted to ensure that the rate of process vessel cool-down is sufficiently rapid, and that the desired final temperature is achieved in a time at least equal to what is possible with prior art methods, and possibly much faster.

Recirculating gas cooling system 60 is preferably a high capacity installation, capable of removing a large amount of heat from the hydrogen-rich (or other gas composition) flowstream, when compared to that possible with nitrogen injection-based cooling. In some process units, the recycle compressor is capable of recirculating a gas with a significantly higher molecular weight than the molecular weight of the recycle stream during normal unit operations. This capability would enable increasing the heat removal rate even more than with a recycle stream containing mostly hydrogen, and therefore increase the effectiveness of the present invention owing to the higher density and heat capacity of the higher molecular weight gas.

Generally, recirculating gas cooling systems suitable for use in the presently preferred embodiments are those having the capacity to lower the recycle hydrogen (or other component such as nitrogen) stream to a temperature significantly below the ultimate desired process vessel temperature. By way of example, with the ultimate desired process vessel temperature on the order of 80 to 100 degrees F. (which would allow personnel entry), the recirculating gas cooling system lowers the recirculating stream temperature approximately 20 to 50° F. below this ultimate temperature, for example 30 to 40° F. below the ultimate desired process vessel temperature. With these exemplary values, the temperature of the recirculating stream would be approximately 40 to 60° F. It is to be understood that a number of variables affect the ultimate recirculating fluid stream temperature, including fluid circulating rate, heat capacity of the vessel(s) being cooled, starting and final desired temperatures, properties of the circulating fluid, etc. It is further understood that the recited temperatures are by way of example only and not limitation.

Design parameters such as recirculating gas cooling system capacity, coolant stream circulation rate and supply temperature, and coolant stream composition may be determined using methods known in the relevant art, in a way that enables an efficient and optimal overall design that minimizes the space required to locate all required temporary cooling equipment.

A Heat Exchanger System Suitable for an Embodiment of the Present Invention

Figure 7:
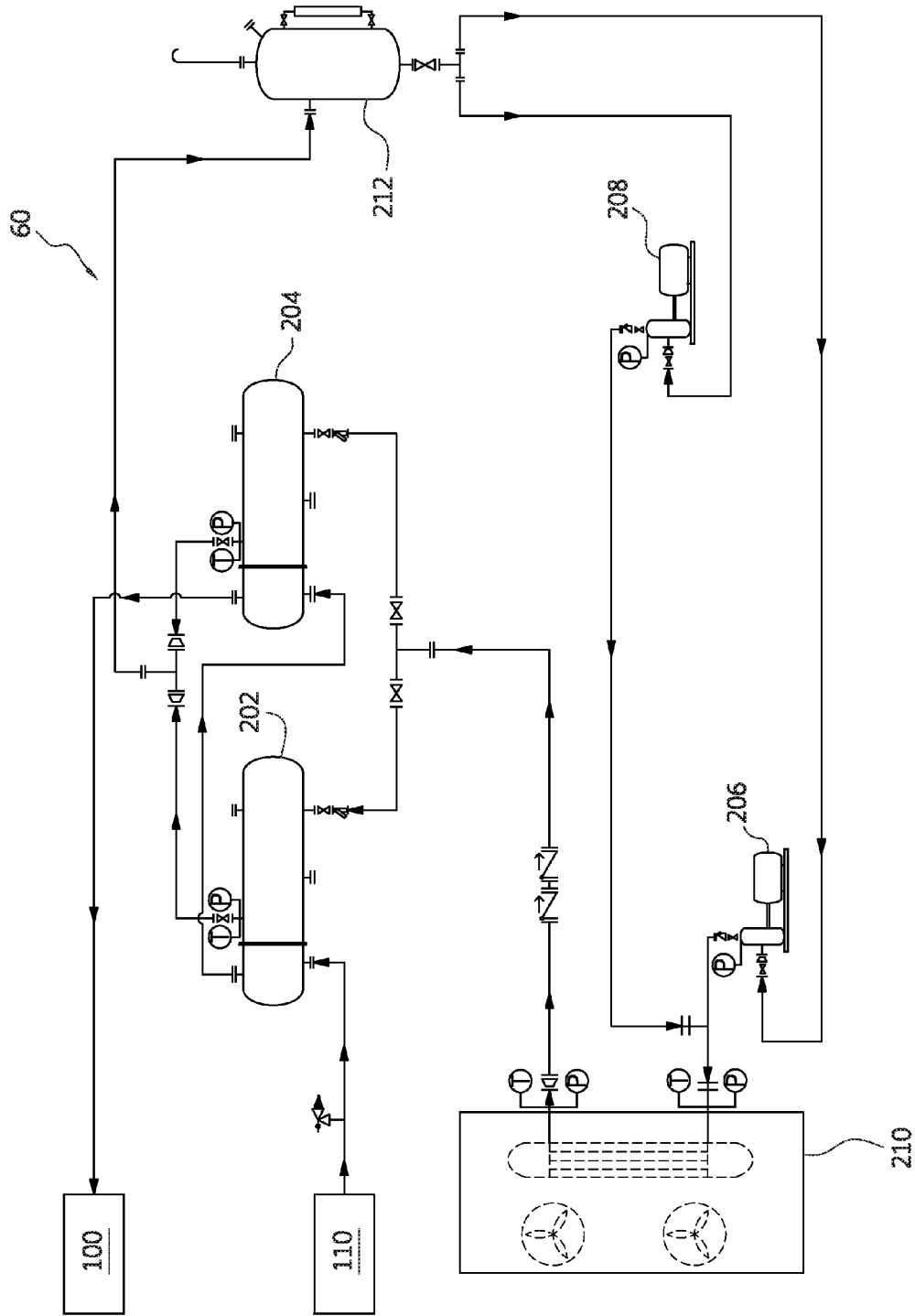
FIG. 7 is a schematic showing further detail of a recirculating gas cooling system 60, for example a heat exchanger system, namely a chilled liquid system, suitable for use in the present invention. The recycle hydrogen stream flows from recycle gas compressor 110 through both heat exchangers 202 and 204, returning to the reactor 100.

While a number of different recirculating gas cooling system design configurations are possible within the scope of the present invention, one acceptable system comprises a heat exchanger system, as shown in FIG. 7, described in more detail below.

Preferably, a heat exchanger system used in the present invention comprises one which utilizes a heat transfer medium providing a high thermal exchange capacity and a "cold side" temperature significantly below ambient air temperature and significantly below ultimate desired process vessel temperature (e.g., on the order of approximately 30-40° F. below such temperature, although other temperature ranges are acceptable and within the scope of the invention). Generally, preferred embodiments of the heat exchanger system suitable for use in the present invention are ones comprising a liquid-cooled (chilled liquid) heat exchanger; that is, wherein the heat exchanger tube, plates, etc. are cooled by a chilled liquid, as opposed to ambient air. Suitable configurations of heat exchangers include those commonly known as shell and tube heat exchangers; plate heat exchangers; or other configurations known in the art. Suitable heat exchangers may be configured in be parallel flow, cross-flow, or countercurrent flow arrangements. It is to be understood that heat exchanger systems suitable for use in the present invention may take other forms, including those comprising a vaporizing/cold refrigerant system cycle to provide the required cooling for the recycle gas.

FIG. 7 shows more detail regarding a suitable embodiment of recirculating gas cooling system 60, which provides refrigerated chilling with pumps 206 and 208 to enable circulating liquid coolant through the "cold" side of heat exchangers 202 and 204 (i.e., the shell side of the exchangers 202 and 204 in this example), which absorbs heat from the hot recycle stream (flowing through the tube side, which, in this example, is the "hot" side). Suitable liquid coolants include, but are not limited to, chilled water or glycol. However, alternative systems might be designed to provide cooling using vaporizing refrigerants as part of a closed-loop refrigeration system. The hot recycle stream from the recycle gas compressor 110 flows in sequence, in this example, through the tube side of heat exchangers 202 and 204. Chilled liquid coolant is pumped through the "cold" or shell side of heat exchangers 202 and 204 in the flowpath indicated in FIG. 5, namely pumped by one or both of pumps 206 and 208; through chiller 210; from chiller 210 to and through heat exchangers 202 and 204; thence to tank 212, which in turn feeds pumps 206 and 208, thereby closing the circulating loop. Note that the example design shown in FIG. 5 incorporates an important safety feature, wherein a liquid level is maintained in tank 212; this tank is vented (for example, to the atmosphere, via a suitably sized metallic pipe) to ensure (i) safe operation of the pumps without cavitation, and also (ii) safe disposition of any combustible gases that might accidentally have leaked from the hot side of the heat exchangers into the cold side coolant stream, and thence into the vessel. Heat is removed from the circulating coolant stream by chiller 210, which may employ refrigerants, compressors, cooling fins, fans, piping, condensers, etc. as is known in the relevant art.

It is understood that other recirculating gas cooling systems or heat exchanger systems could be used; FIG. 7 is only one of a number of suitable systems. The terms "recirculating gas cooling system" and "heat exchanger system" as used in this application are intended in a broad sense, as systems capable of cooling a recirculating fluid stream significantly below ambient temperature and ultimate desired process vessel temperature, for example in the range of approximately 30-40° F. below said temperatures. This is an exemplary temperature range only, as temperatures above and below are also suitable, for example from approximately 10 to 50° F. or more below ultimate desired process vessel temperature. Acceptable temperature ranges may be above or below the ranges specified. As noted above, recirculating gas cooling systems suitable for use include but are not limited to chilled liquid systems, vaporization/cold refrigerant systems, or any other process capable of producing the desired recirculating fluid temperature.

It is to be understood that the range(s) of temperature differentials recited therein are only exemplary of some of the known suitable temperature ranges; the scope of the invention covers temperature ranges both above and below the recited ranges. Further, all references herein to degrees Fahrenheit (° F.) are by way of convenience only, and any other temperature scale can be used.

Valves, controls, pipe fittings, etc. may be used in the system in numbers, locations and configurations known to those having ordinary skill in the relevant art. Materials, pressures, temperatures, capacities, dimensions, strengths, etc. may be varied to suit particular installations, as known in the art. The flow rate through the system is adjusted as appropriate, and is based on the capacities and capabilities of compressor 110 and the interconnecting piping, as known in the art. Different recirculating fluid compositions, in addition to hydrogen, may be used and are within the scope of the invention.

Alternate Placements of Recirculating Gas Cooling System in Reactor Loop

Figure 6:
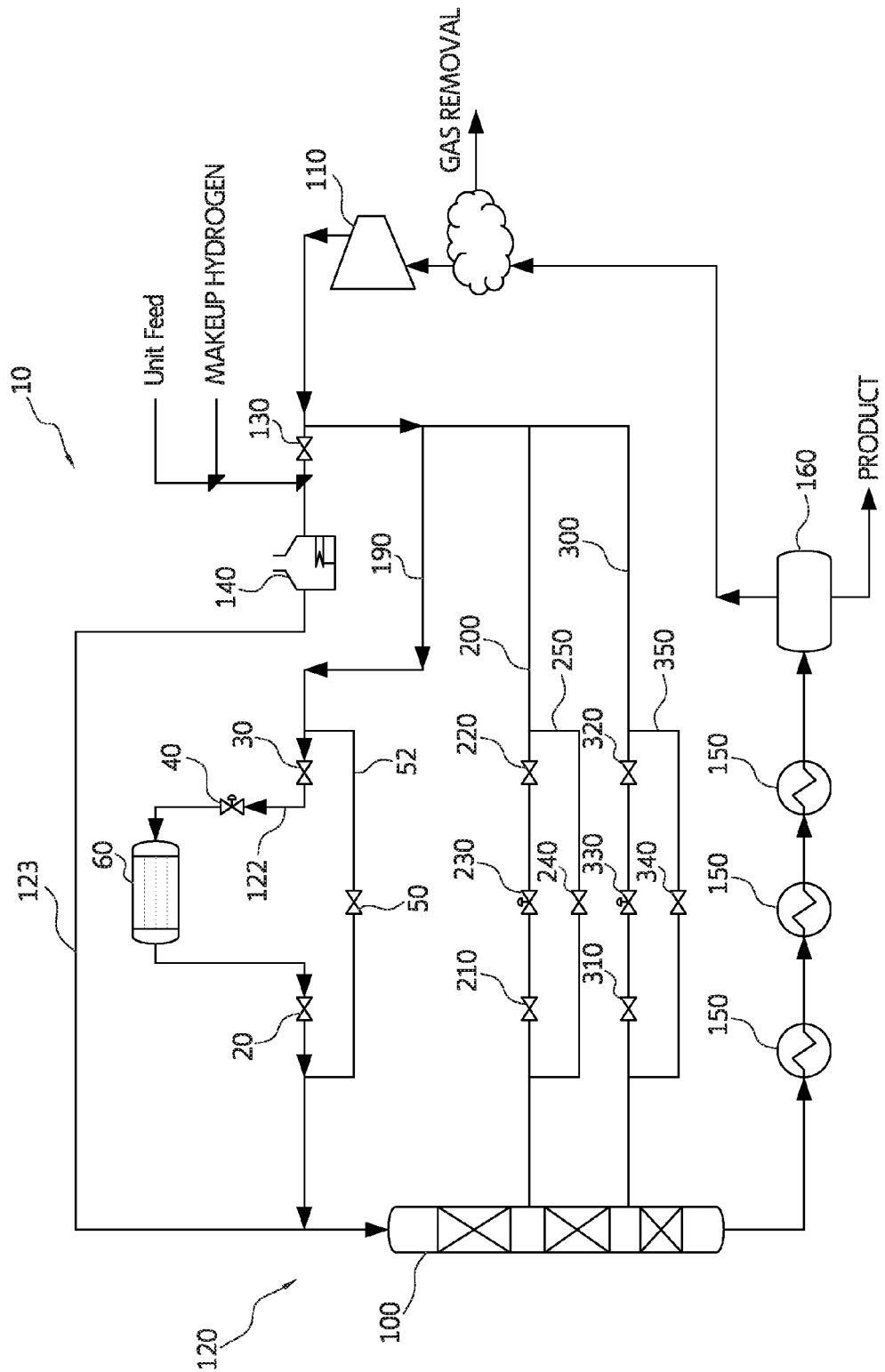
FIG. 6 is a schematic of the flow arrangement of FIG. 5, with the bypass valve 50 closed and recirculating gas flowing through the primary flowpath in quench line 190 and through the newly installed recirculating gas cooling system positioned in the primary flow path 122. Note that valves 30, 40 and 20 are open and valve 50 is now closed.
Figure 8:
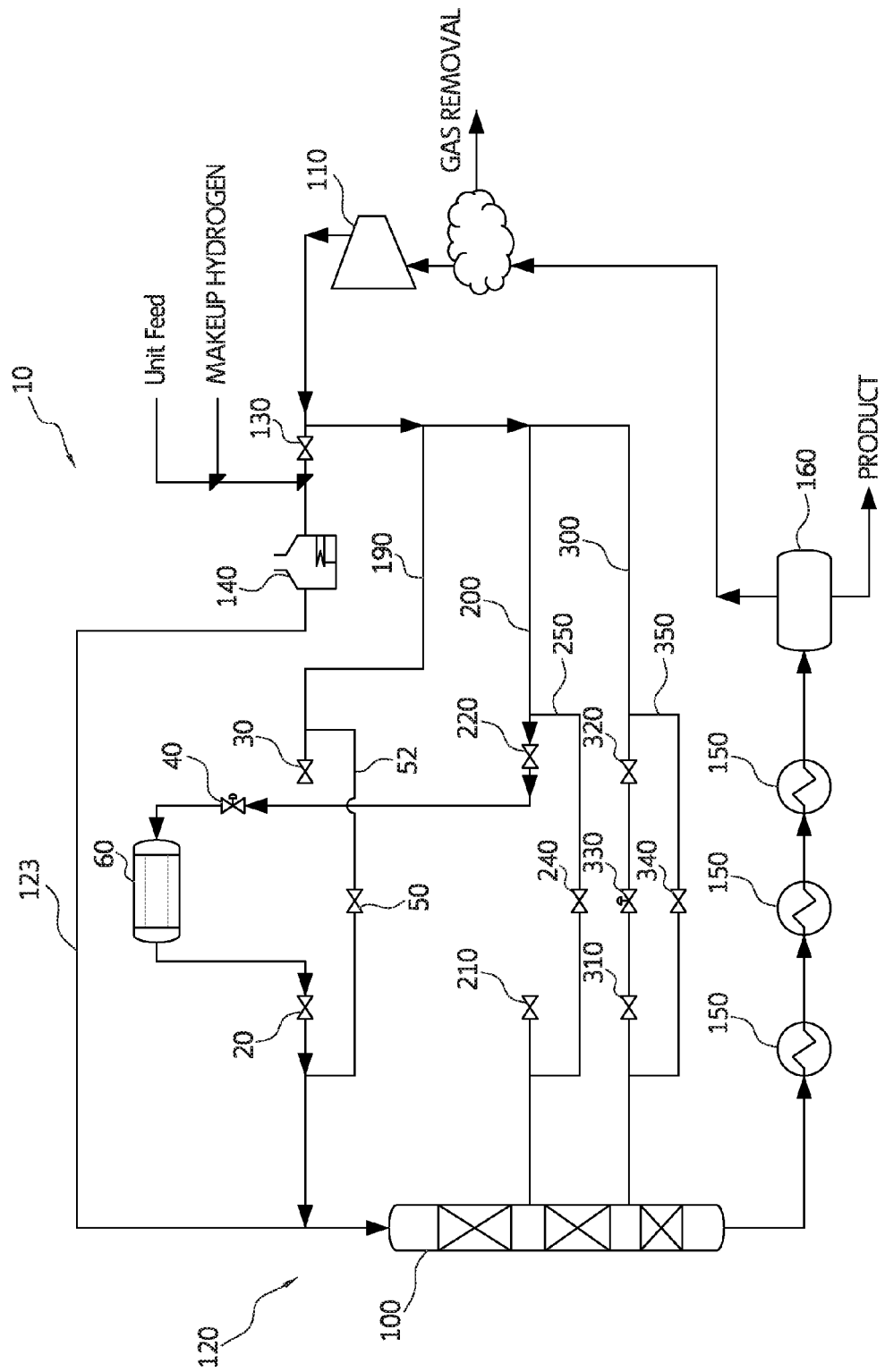
FIG. 8 is a schematic of an alternate flow arrangement, with the recirculating gas cooling system positioned in another part of the flow path through the quench flowlines.

The present invention comprises arrangements in which recirculating gas cooling system 60 is positioned in process system 10 in alternate locations than that shown in FIGS. 5 and 6. Namely, the line from which the recycle stream is withdrawn from the discharge of compressor 110 and routed through the recirculating gas cooling system, for cooling as described herein, may be different from the line where the hydrogen or other recycle stream is reinjected into the system. Such positioning may be necessitated by a lack of space (between the block valves 20 and 30 of FIGS. 1, 2, and 3) to install the required piping elbows or other pipe fittings to permit installation of recirculating gas cooling system 60. As earlier described, FIG. 8 shows alternate flowlines. In the embodiment shown in FIG. 8, recirculating gas cooling system 60 is fed by one of lower flowlines 200 or 300, used for supplying hydrogen or other chilled recycle gas to a catalyst bed in the process vessel 100 (in normal operation, this stream is used to supply quench hydrogen to a catalyst bed), namely positioned upstream of a pressure regulating control valve in said line. The point of return for this cooled hydrogen stream may be downstream of such a pressure regulating valve located on a line that enters the top bed of process vessel 100, e.g. to line 120 (through valve 20, located upstream of the top catalyst bed in reactor vessel 100). Note that recycle stream fed to recirculating gas cooling system 60 could also have been withdrawn from flowline 300 in an analogous manner. In such instances, the appropriate existing block valves, downstream and upstream of the point of withdrawal and reinjection, respectively, would be closed to enable isolation in the desired manner. Both pressure regulating valves would, of course, be removed or relocated in order to permit these modifications to be made on a temporary basis.

Figure 9:
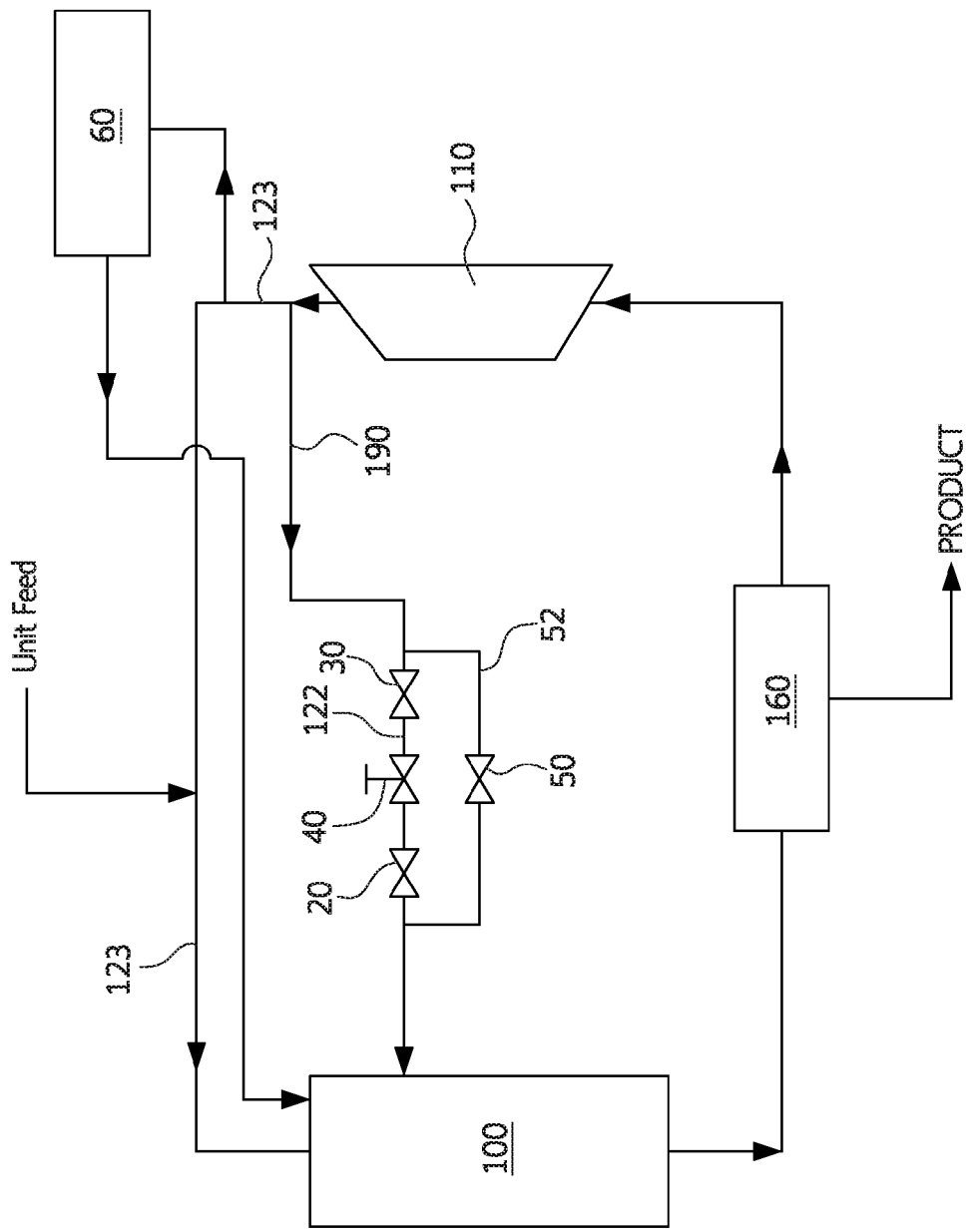
FIG. 9 is a schematic of another placement of the recirculating gas cooling system within the overall system.

FIG. 9 shows another possible placement of recirculating gas cooling system 60, as described herein, to achieve lower recycle gas temperatures than ambient. Here, recirculating gas cooling system 60 is not incorporated into one of the quench gas flowlines, but is placed into the recycle gas flowpath at any point downstream of recycle gas compressor 110 and upstream of process vessel 100. An installation of this nature may be done during initial fabrication of a new facility, or during a unit shutdown for turnaround. This placement may be beneficially done when space limitations prevent placement of the recirculating gas cooling system in any other location.

CONCLUSION

While the preceding description contains many specificities, it is to be understood that same are presented only to describe some of the presently preferred embodiments of the invention, and not by way of limitation. Changes can be made to various aspects of the invention, without departing from the scope thereof, for example:

- capacities, sizes, operating pressures, temperatures, etc. of the various components may be altered to suit particular installations;
- materials of construction for the various components may be changed to suit particular applications;
- the process vessels to be cooled with the apparatus and methods of the present invention may be of any size, nature, or purpose;
- one or more quench gas flowlines may or may not be available, in which case the recirculating gas cooling system would be installed in the piping immediately downstream of the compressor;
- the recirculating gas cooling system may be any system having the capability of cooling beyond that of an ambient air or water cooler, including liquid cooled heat exchanger systems, chilled water or glycol, refrigeration systems, or any other similar system;
- the fluid stream being circulated through the process vessel may comprise a hydrogen-rich fluid stream, or may comprise fluids of a different composition known in the relevant art;
- the cooling method of this invention may be used to cool process vessels for repair, catalyst replacement, or any other purpose.

Therefore, the scope of the invention is to be determined not by the illustrative examples set forth above, but by the appended claims and their legal equivalents.

I claim:

1. A process vessel system having improved cooldown capability, comprising:
   a process vessel sized and arranged for containing a catalyst inventory therein and adapted for access to an interior of said process vessel for replacement of said catalyst;
   a compressor fluidly connected to said process vessel by a piping system creating a recirculating fluid flowpath through said compressor and said process vessel; and
   a recirculating gas cooling system comprising a heat exchanger system operatively connected to said piping system, wherein said recirculating gas cooling system is positioned downstream of said compressor and upstream of said process vessel, and is capable of lowering the temperature of said fluids to a temperature within the range of about 30 to 40° F. below said desired final temperature, and wherein said desired final temperature is within the range of about 80° F. to about 100° F.

2. The system of claim 1, wherein said process vessel comprises a catalyst inventory therein.

3. The system of claim 2, wherein said recirculating gas cooling system comprises a chilled liquid heat exchanger system.

4. The system of claim 2, wherein said recirculating gas cooling system comprises a vaporizing/cold refrigerant heat exchanger system.

5. The system of claim 2, wherein said piping system comprises one or more quench flowlines having a primary fluid flowpath and a bypass fluid flowpath.

6. The system of claim 5, wherein said recirculating gas cooling system is disposed in said primary fluid flowpath.

7. The system of claim 6, wherein said recirculating gas cooling system comprises a heat exchanger having a hot side and a cold side, said hot side comprising a flowpath for fluids to be cooled;
   said cold side comprising a recirculating flowpath comprising piping, a pump, and a chiller, and further comprising a volume of coolant within said circulating flowpath, whereby said coolant absorbs heat from said hot side of said heat exchanger and discharges said heat in said chiller, as said pump pumps said coolant through said recirculating flowpath.

8. A process vessel cooldown system, comprising:
   a process vessel having a volume of catalyst therein and adapted for access to an interior thereof for replacement of said catalyst;
   a recycle gas compressor operatively connected to said process vessel by a piping system, said piping system providing a path for said recycle gas compressor to recirculate a gas stream through said recycle gas compressor and said process vessel, said recirculating gas stream absorbing heat from said process vessel; and
   a recirculating gas cooling system comprising a heat exchanger operatively coupled to said piping system, wherein said recirculating gas cooling system is disposed downstream of said recycle gas compressor and upstream of said process vessel,
   whereby when a gas stream is recirculated through said system, a portion of the heat in said recirculating gas stream is removed by said recirculating gas cooling system, thereby lowering a temperature of said process vessel to a desired temperature in the range of approximately 80° F. to 100° F., and
   wherein said recirculating gas cooling system cools said gas stream to a temperature in the range of about 10 to 50° F. below said desired temperature.

9. The process vessel cooldown system of claim 8, wherein said piping system comprises:
   at least one quench gas flowline comprising a primary fluid flow path and a bypass fluid flow path, and wherein said recirculating gas cooling system is disposed in said primary flow path, and further comprising valves which enable gas flow to be selectively routed through said primary flow path and said secondary flow path.

10. The process vessel cooldown system of claim 9, wherein said recirculating gas cooling system comprises:
    a heat exchanger having a hot side and a cold side, said hot side comprising a flowpath for fluids to be cooled and through which said recirculating fluid stream flows;
    said cold side comprising a recirculating flowpath comprising piping, a pump, and a chiller, and further comprising a volume of coolant within said circulating flowpath, whereby said coolant absorbs heat from said hot side of said heat exchanger and discharges said heat in said chiller, as said pump pumps said coolant through said recirculating flowpath.

11. The process vessel cooldown system of claim 10, further comprising a tank disposed in said recirculating flowpath and through which said coolant flows, said tank maintaining a level of said coolant therein, said tank further comprising a vent.

12. A method for reducing the temperature of process vessels to a desired final temperature, comprising the steps of:
    a. providing a process vessel system comprising:
       a process vessel comprising an inventory of catalyst therein and adapted to permit access to an interior of said process vessel for replacement of said catalyst inventory;
       a compressor fluidly coupled to said process vessel by a piping system, forming a circulating system though said compressor and said pressure vessel; and
       a recirculating gas cooling system comprising a heat exchanger disposed in said circulating system downstream of said compressor and upstream of said process vessel;
    b. providing a volume of gas within said circulating system;
    c. circulating said gas though said circulating system, by use of said compressor, whereby said gas absorbs heat from said process vessel; and
    d. removing heat from said gas by use of said recirculating gas cooling system, until said desired final temperature of said process vessel is reached, said gas cooled to a temperature in the range of between about 20 to 50° F. below said desired final temperature of said process vessel.

13. The method of claim 12, wherein said gas comprises a hydrogen-rich stream.

14. The method of claim 13, wherein said process vessel comprises a hydrotreater, hydrocracker, or catalytic reformer.

15. A method of cooling a process vessel from an operating temperature to a second temperature, comprising the steps of:
    a. providing a system comprising a process vessel fluidly connected to a compressor by a piping system, said process vessel comprising a volume of catalyst therein and adapted to permit access to said volume of catalyst for maintenance thereof, said piping system permitting recirculation of fluids through said vessel and said compressor, said piping system comprising a quench gas flowline comprising a primary flow path and a bypass flow path, and valves permitting fluid flow to be selectively controlled through either said primary flow path and said bypass flow path;
    b. during operation of said process vessel, operating said valves so as to route fluid flow through said bypass flow path;
    c. installing a recirculating gas cooling system comprising a heat exchanger in said primary flow path, downstream of said compressor and upstream of said process vessel, while operation of said process vessel continues with flow through said bypass flow path, said recirculating gas cooling system adapted to remove heat from said flow when said flow is through said primary flow path; and
    d. operating said valves so as to route gas through said primary flow path and continue process operation of said process vessel.

16. The method of claim 15, comprising the further steps of:
    e. ceasing process operation with said process vessel, and cooling said process vessel from said operating temperature to an intermediate temperature;

f. circulating a gas through said vessel by use of said compressor, said gas passing through said process vessel, said compressor, and said recirculating gas cooling system in said piping system;
g. transferring heat from said process vessel to said gas;
h. removing heat from said gas by said recirculating gas cooling system, and
I. continuing steps (f)-(h) until a temperature of said vessel has lowered from said intermediate temperature to said second temperature.

17. The method of claim 16, wherein said gas is cooled by said recirculating gas cooling system to a temperature in the range of about 10 to 50° F. below said second temperature.

18. The method of claim 16, wherein said gas is cooled by said recirculating gas cooling system to a temperature in the range of about 30 to 40° F. below said second temperature.

19. The method of claim 16, wherein said second temperature is sufficiently low to allow personnel entry for replacement of a catalyst within said process vessel.

* * * * *